(12) United States Patent
Imaizumi et al.

(10) Patent No.: US 8,225,994 B2
(45) Date of Patent: Jul. 24, 2012

(54) CARD PROCESSING APPARATUS AND CARD PROCESSING METHOD

(75) Inventors: Atsuhiro Imaizumi, Owariasahi (JP); Masatsugu Uneda, Owariasahi (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 457 days.

(21) Appl. No.: 12/491,358

(22) Filed: Jun. 25, 2009

(65) Prior Publication Data

US 2010/0051688 A1 Mar. 4, 2010

(30) Foreign Application Priority Data

Aug. 27, 2008 (JP) .................................. 2008-217516

(51) Int. Cl.
*G06K 5/00* (2006.01)
(52) U.S. Cl. ........................................ 235/380; 235/375
(58) Field of Classification Search .................. 235/379, 235/380, 375
See application file for complete search history.

(56) References Cited

U.S. PATENT DOCUMENTS

2005/0218215 A1* 10/2005 Lauden ......................... 235/380

FOREIGN PATENT DOCUMENTS

| CN | 1272932 | 11/2000 |
|----|---------|---------|
| CN | 1758264 | 4/2006 |
| CN | 1873705 | 12/2006 |
| EP | 1 533 759 | 5/2005 |
| EP | 1 732 047 | 12/2006 |
| JP | 2004-110365 | 4/2004 |
| JP | 2006-195591 | 7/2006 |
| JP | 2006-320715 | 11/2006 |

OTHER PUBLICATIONS

Office Action issued in Chinese Patent Application No. 200910149978.3 on May 27, 2011.

* cited by examiner

*Primary Examiner* — Karl D Frech
(74) *Attorney, Agent, or Firm* — Antonelli, Terry, Stout & Kraus, LLP.

(57) ABSTRACT

A card processing apparatus is provided with: a storage unit for storing biological information read by a biological information acquiring unit as a result of comparing biological information read from a card by a card handling unit with the biological information read from a user by the biological information acquiring unit, a confirmation is made that the user is an owner of the card; and a control unit for judging whether storing operations for storing the biological information in the storage unit have been carried out preselected times, for producing biological information stored in another card newly issued by employing a plurality of biological information stored in the storage unit when the storing operations have been carried out the preselected times, and for instructing the user to again acquire biological information when the storing operations have not yet been carried out the preselected times.

18 Claims, 5 Drawing Sheets

CARD PROCESSING APPARATUS AND CARD PROCESSING METHOD

BACKGROUND OF THE INVENTION

The present invention is related to a card processing apparatus and a card processing method, which update a card having an authentication function capable of confirming whether or not a person having such a card is an authorized person with employment of biological information, for instance, a fingerprint, a venous pattern, and the like.

In financial transactions performed among cash dispensers (will be referred to as "CDs" hereinafter) and automatic teller machines (will be referred to as "ATMS" hereinafter) of financial institutions, IC cards have been considerably conducted in order to avoid forgeries of cards and spoofing performed by a third party.

In IC cards, as compared with conventional cards equipped with magnetic stripes, the IC cards can be hardly duplicated, and also, security of the IC cards can be secured, namely, internal information stored in the IC cards cannot be readily stolen. In addition, since an attention has been paid to such a technical aspect that amounts of information which can be stored in these IC cards can be considerably increased, and furthermore, calculation process operations can be carried out inside IC cards, such IC cards equipped with biometrics authentication functions have been practically utilized. That is, in the above-described biometrics authentication functions, while biological information such as fingerprints and venous patterns is held in an IC card as enrollment data, a confirmation is made whether or not a user having the IC card is an authorized user by verifying a feature pattern of a living body as to the user, which has been read by a sensor, with another feature pattern of the living body which has been previously stored in this IC card as enrollment data.

In the IC cards equipped with the biometrics authentication functions, since plural pieces of biological information of users have been previously stored in these IC cards and verifying process operations are similarly carried out within the IC cards, it is possible to avoid that plural pieces of the biological information are leaked outside these IC cards. As a result, secrecies of personal information can be maintained.

On the other hand, with respect to cards which are used in financial institutions, expiration terms have been set, for instance, 5 years after relevant cards were issued have been set. Accordingly, updating procedures of these cards are required. When IC cards equipped with biometrics authentication functions are updated, as previously explained, biological information cannot be derived from these IC cards, so that such biological information enrolled in old IC cards (namely, IC cards which have not yet been updated) cannot be duplicated to new IC cards (namely, IC cards which have been updated). As a consequence, in such a case that IC cards having biometrics authentication functions are updated, users of these IC cards must go to relevant departments of financial institutions so as to take such necessary procedures that biological information of these users is again registered (enrolled) in new IC cards.

As methods capable of solving such a cumbersome process that the users must go to the relevant departments of the financial institutions when the IC cards equipped with the biometrics authentication functions are updated, one updating method executed by an ATM machine has been proposed (refer to JP-A-2006-195591). In accordance with the above-described conventional updating method, the biological information which has been enrolled in the old IC card is verified with respect to the feature pattern of the living body as to the user, which has been read by the sensor. Then, in such a case that the confirmation can be made that the user having the old IC card is the authorized user, the feature pattern of the living body as to the user, which has been read by the sensor in a single reading operation, is registered in the new IC card as the enrollment data.

On the other hand, another registering method for biological information has been proposed (refer to JP-A-2006-320715): That is, while a plurality of biological information have been acquired, such a biological information which is suitable for biometrics authentication is registered in an IC card.

In biometrics authentication, a feature pattern of a living body which has been previously enrolled as enrollment data is verified with another feature pattern of the living body which has been read from the living body by a sensor so as to acquire a verified coincident degree. In such a case that a coincident degree exceeds a threshold level, it is so assumed that it can be confirmed that a user having an IC card equipped with such a biometrics authentication function is an authorized user. When verified coincident degrees are judged, there is no possibility that verified coincident degrees are completely made equal to each other due to a difference in setting manners of a living body, noises of a sensor, and the like. However, there are some possibilities that verified coincident degrees may be slightly made different from each other. Under such a circumstance, since user friendly characteristics are considered, threshold levels capable of confirming whether or not users having IC cards are authorized users have been set with certain margins: That is, for instance, if a verified coincident degree between an acquired feature pattern of a living body and enrollment data exceeds 80%, then it is so assumed that a user having an IC card can be recognized as an authorized user.

As a consequence, in the above-described conventional updating method of JP-A-2006-195591, if such a feature pattern of the living body that the confirmation could be made that the user having the IC card is the authorized user by merely performing the single reading operation is directly registered in the new IC card, then this feature pattern which cannot be made coincident with the feature pattern of the living body by 100%, which has been registered in the old IC card, may be employed as the enrollment data of the new IC card. As a result, due to the execution of the updating procedure, such a feature pattern of the living body is registered in the new IC card, the quality of which has been deteriorated, as compared with the feature pattern of the living body in the old IC card.

Also, in such a biometrics authentication case that a confirmation is performed whether or not a user having a new IC card into which the deteriorated feature pattern of the living body has been registered is an authorized user, the deteriorated enrollment data may cause the verified coincident degree to be lowered. As a result, there is such a problem that the authentication precision is deteriorated.

In the method for registering the biological information described in JP-A-2006-320715, the biological information is newly registered in the IC card under the guidance of the person in charge belonging to the financial institution. However, this registering method is not equal to the below-mentioned registering method of the present invention, in which a user may independently register (update) biological information in a new IC card without any guidance made by the person in charge belonging to the financial institution. As a consequence, even in such a case that the user independently registers (updates) the biological information, the first-mentioned registering method does not take any consideration in order to achieve that the biological information which is suitable for the biometrics authentication is registered in the new IC card. For example, in such a case that a user registers biological information by an unmanned ATM machine in the present invention, since the user is not accustomed to the registering process operation of the biological information, there are some possibilities that his finger of this user may be held up to the biological information acquiring apparatus in the inclined manner, or in the rolling manner, so that such a biological information which is not suitable for an enrollment (namely, biological information whose situation can be hardly represented even by user himself) may be mistakenly registered to the new IC card. Also, in an updating process operation of an IC card, which is performed without intervening a person in charge belonging to a financial institution, since the person in charge cannot check this updating process operation, such a system having higher security is necessarily provided in order to avoid that a person having a bad will may alter his biological information which will be registered to an IC card.

SUMMARY OF THE INVENTION

In order to solve the above-described problems, a card processing apparatus, according to an aspect of present invention, is featured by comprising: a storage unit for storing thereinto biological information read by a biological information acquiring unit in such a case that as a result of comparing biological information read from a card by a card handling unit with the biological information read from a user by the biological information acquiring unit, a confirmation is made that the user is an owner of the card; and a control unit for judging whether or not storing operations for storing the biological information in the storage unit have been carried out preselected times, for producing biological information which is stored in another card which will be newly issued by employing a plurality of biological information stored in the storage unit in such a case that the storing operations have been carried out the preselected times, and for instructing the user to again acquire biological information thereof in such a case that the storing operations have not yet been carried out the preselected times.

A suitable feature pattern is determined among feature patterns of a living body which have been acquired plural times, and then, the determined feature pattern is registered in a new IC card in order that a deterioration in enrollment data caused by an updating procedure is reduced. As a result, even when authentication is performed by employing such a new IC card which has already been updated, it is possible to prevent lowering of authentication precision.

Other objects, features and advantages of the invention will become apparent from the following description of the embodiments of the invention taken in conjunction with the accompanying drawings.

DESCRIPTION OF THE INVENTION

A description is made of various embodiments of the present invention as follows:

Embodiment 1

An embodiment 1 of the present invention will now be described with reference to FIG. 1 to FIG. 5.

Figure 1:
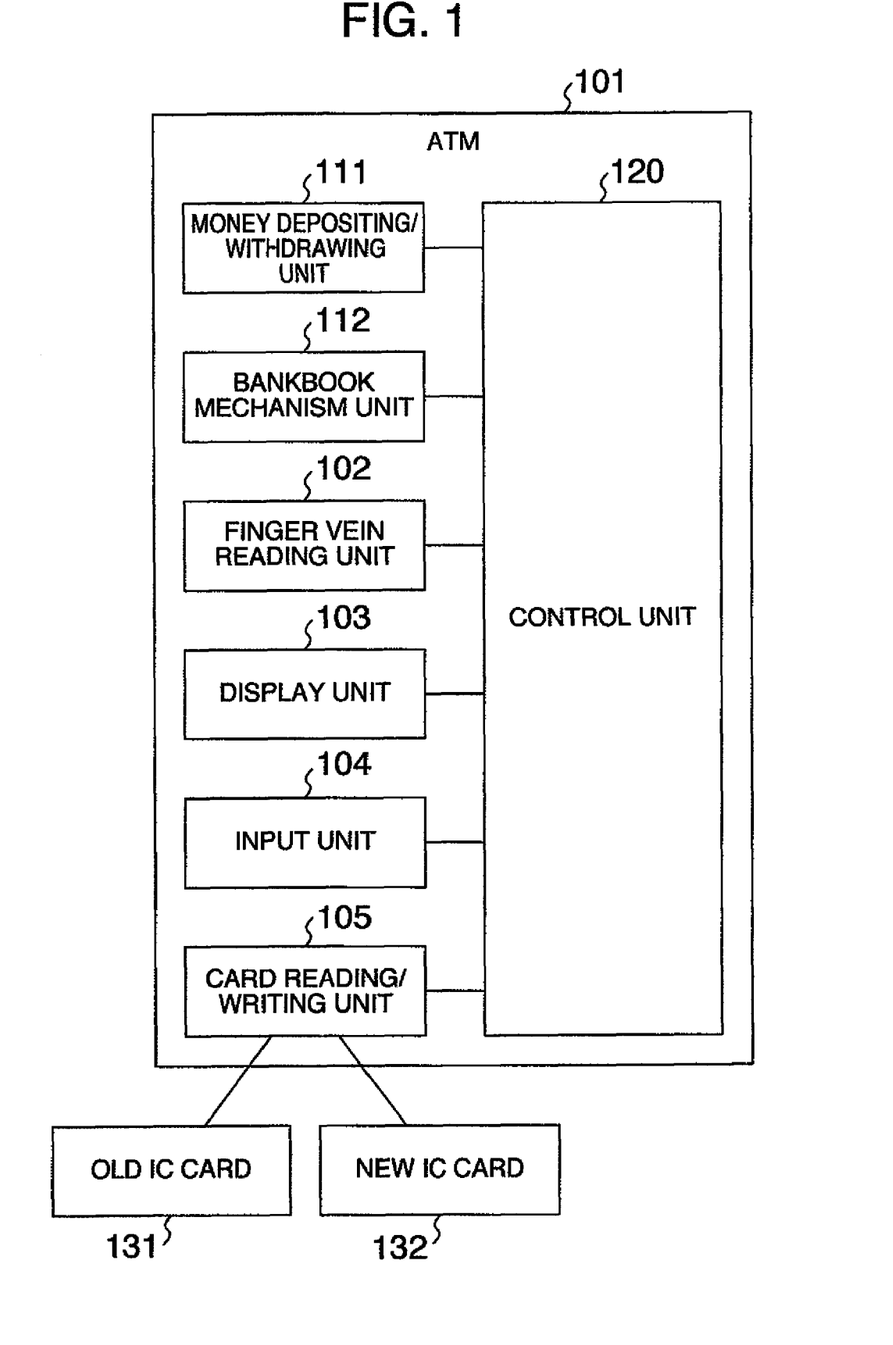
FIG. 1 is a structural diagram for schematically indicating an ATM according to an embodiment of the present invention.

FIG. 1 is a structural diagram for indicating an ATM 101 according to the present embodiment.

The ATM (Automatic Teller Machine) 101 is equipped with a finger vein reading unit 102, a display unit 103, an input unit 104, a card reading/writing unit (card handling unit) 105, a money depositing/withdrawing unit 111, a bankbook mechanism unit 112, and a control unit 120. The finger vein reading unit 102 reads a finger venous pattern of a user as biological information. The display unit 103 displays thereon guidance and the like, which are related to a transaction for the user. The input unit 104 inputs therein information for transactions by being operated by the user. The card reading/writing unit (card handling unit) 105 reads/writes an IC card. The money depositing/withdrawing unit 111 processes paper money which is deposited and/or withdrawn. The bankbook mechanism unit 112 performs a printing process operation with respect to a bankbook. The control unit 120 controls processing operations of these structural units.

Also, both an old IC card 131 and a new IC card 132 correspond to cards equipped with IC chips, and are inserted into the IC card reading/writing unit 105 by a user when a transaction is commenced. Also, it is desirable that both the display unit 103 and the input unit 104 are designed as input/display units constructed by employing liquid crystal monitors equipped with touch panels, or the like. The display unit 103 and the input unit 104 may display various sorts of information on display screens thereof, and at the same time, may sense depressions of entering various sorts of items which are contained in the display screen.

It should be understood that since the ATM 101 processes various sorts of transactions by reading information contained in IC cards, this ATM 101 may also be referred to as a "card processing apparatus" which processes the IC cards.

Figure 2:
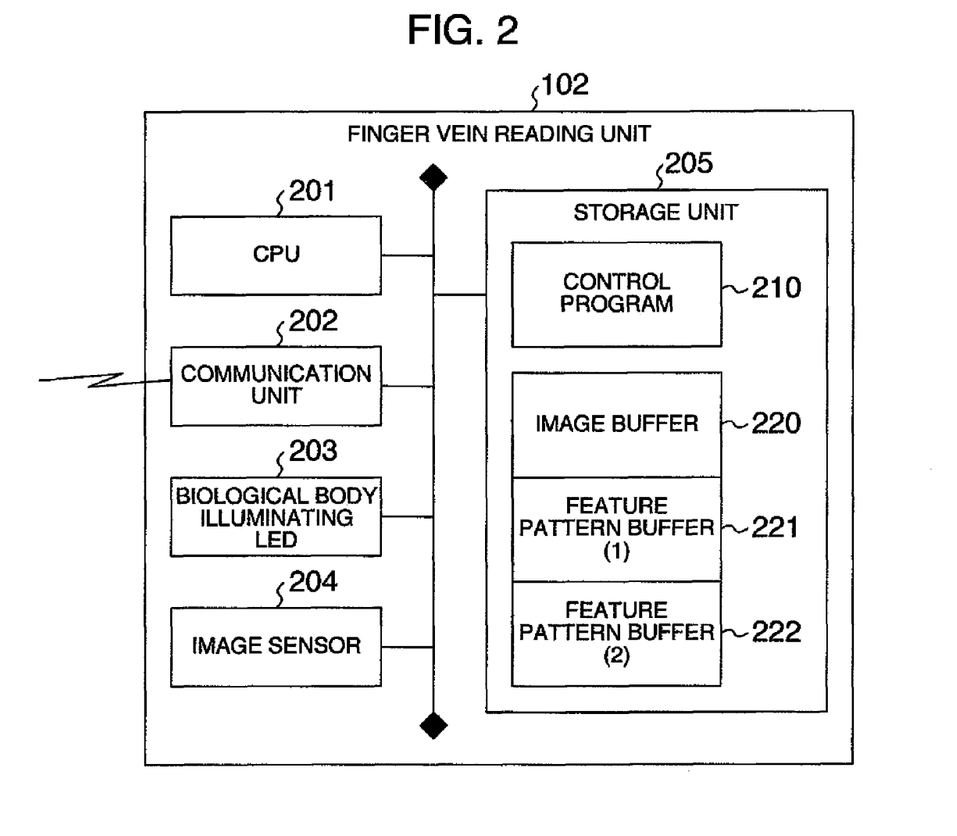
FIG. 2 is a structural diagram for schematically indicating a finger vein reading unit provided in the ATM of FIG. 1.

FIG. 2 is a diagram for schematically showing an arrangement of the above-described finger vein reading unit 102.

The finger vein reading unit 102 is equipped with a CPU (control unit) 201, a communication unit 202, a living body illuminating LED 203, an image sensor 204, and a storage unit 205. While the CPU 201 corresponds to such a processor which executes process/control operations in the finger vein reading unit 102, the CPU 201 executes control operations for various sorts of programs, and data processing operations (will be explained later). The communication unit 202 corresponds to such an interface which is employed in order to connect the finger vein reading unit 102 with the ATM 101. The living body illuminating LED 203 corresponds to an illumination-purpose LED (Light Emitting Diode) for illuminating near infrared rays in order to acquire images of living bodies. For instance, in vein authentication, the living body illuminating LED 203 employs a near infrared radiation LED which is suitable to photograph a venous pattern of a finger. The image sensor 204 corresponds to such a sensor for acquiring images of living bodies, and is constituted by a CCD image sensor, a CMOS image sensor, or the like. The image sensor 204 is employed in order to acquire an image of a finger illuminated by the living body illuminating LED 203. In the storage unit 205, storage areas for various sorts of programs, and data buffering storage areas have been secured, which are provided so as to operate the finger vein reading unit 102.

A control program 210 which has been stored in the storage unit 205 is such a program for controlling the finger vein reading unit 102. As previously described, the control program 210 is controlled by the hardware structure of the CPU 201. An image buffer 220 corresponds to a memory area used to store thereinto biological image data photographed by the image sensor 204. Both a feature pattern buffer (1) 221 of a living body, and a feature pattern buffer (2) 222 thereof correspond to memory areas which are provided in order to store thereinto feature patterns of the living body, which have been extracted from the biological image data.

It should also be noted that either the finger vein reading unit 102 or the image sensor 204 may also be referred to as a "biological information acquiring unit" as such a structure which is employed in order to acquire the biological information.

Figure 3:
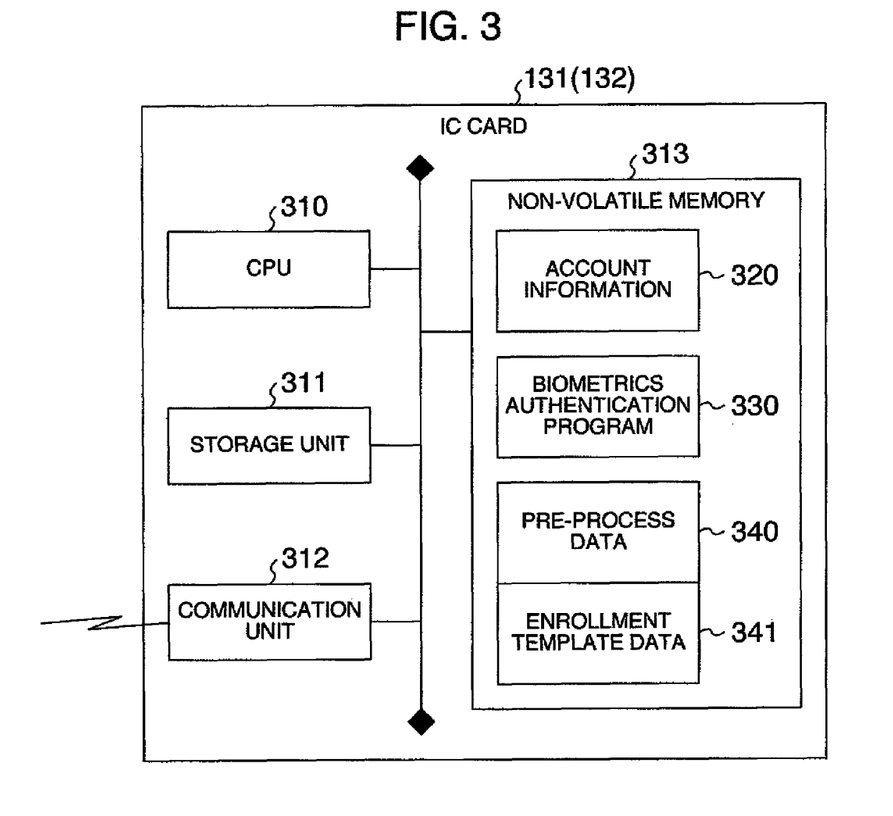
FIG. 3 is a structural diagram for schematically representing an IC card used in the ATM of FIG. 1.

FIG. 3 is a diagram for schematically representing a structure as to the old IC card 131 and the new IC card 132. While these old/new IC cards 131 and 132 have biometrics authentication functions, these old/new IC cards 131 and 132 are inserted in the card reading/writing unit 105 by a user when contents of these old/new IC cards 131 and 132 are updated.

Any IC card of the old IC card 131 and the new IC card 132 is equipped with a CPU (control unit) 310, a storage unit 311, a communication unit 312, and a non-volatile memory 313. While the CPU 310 corresponds to such a processor which executes process/control operations in the old/new IC cards 131/132, the CPU 310 executes control operations for various sorts of programs, and data processing operations (will be explained later). The communication unit 202 corresponds to such an interface which is employed in order to connect the old/new IC cards 131/132 via the IC card reading/writing unit 105 to the ATM 101. The above-described storage unit 311 is such a RAM (Random Access Memory) which temporarily stores thereinto data in verifying process operations executed in the old/new IC cards 131/132, for example, which temporarily stores thereinto biological feature pattern data read out from a user. The non-volatile memory 313 corresponds to such a memory having a non-volatile characteristic, by which programs and data present in the old/new IC cards 131/132 are held.

In the non-volatile memory 313, account information 320, a biometrics authentication program 330, pre-process data 340, and enrollment template data 341 have been previously stored.

In this case, in the account information 320, such information which is required in financial transactions has been recorded. For instance, a name, an account number, a branch number, and an account sort of an IC card owner, and a validity term of the IC card, and the like have been previously recorded in the account information 320. The biometrics authentication program 330 corresponds to such a program for controlling the old/new IC cards 131/132. As previously explained, the biometrics authentication program 330 is controlled by the hardware structure of the CPU 310.

Both the pre-process data 340 and the enrollment template data 341 correspond to such information which are employed so as to authenticate a living body, and are held in the old/new IC cards 131/132 having the biometrics authentication functions. Precisely speaking, the pre-process data 340 corresponds to such a data which is utilized when a feature pattern of a living body is acquired from the living body. Also, the enrollment template data 341 is verified by the feature pattern of the living body acquired from the living body so as to confirm whether or not a person having an IC card is an authorized person, while the enrollment template data 341 cannot be read out from the old/new IC card 131/132.

Both the pre-process data 340 and the enrollment template data 341 have been previously brought into enrolled conditions in the old IC card 131, and have been previously brought into unenrolled conditions in the new IC card 132. Then, since an IC card updating operation is carried out, both the pre-process data 340 and the enrollment template data 341 are newly enrolled in the new IC card 132.

Figure 4:
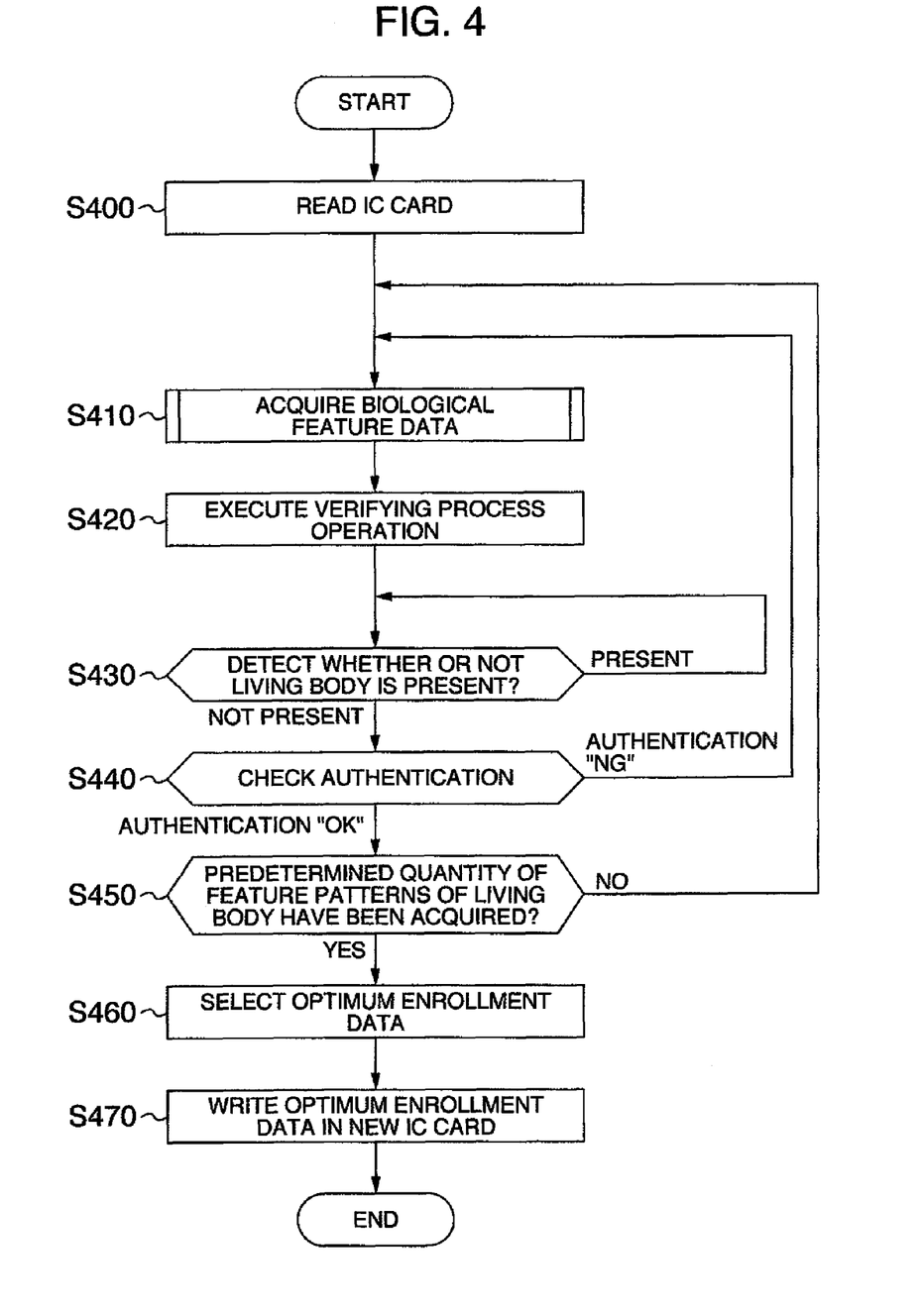
FIG. 4 is a flow chart for describing process operations as to a method for updating the IC card shown in FIG. 3, according to the embodiment of the present invention.

FIG. 4 is a flow chart for describing process operations executed when an IC card having a biometrics authentication function is updated. A description is made of respective processing steps with reference to the above-described flow chart.

When a customer sensing unit (not shown) senses that a user has approached the ATM 101, the control unit 120 of the ATM 101 displays such a guidance as "cash depositing transaction", "cash withdrawing transaction", "balance inquiry", and "card update" on the display unit 103. The user may select an item which is wanted by this user from the above-explained displayed items. In the present embodiment, a description is made of process operations executed in such a case that the item of "card update" is depressed by the user.

When the control unit 120 accepts the selection of the item "card update" via the input unit 104, the control unit 120 displays on the display unit 103, such a guidance for instructing the user that both the old IC card 131 into which the biological information has already been enrolled (registered), and the new IC card 132 into which the newly issued biological information has not yet been registered are inserted to the card reading/writing unit 105. In response to the above-explained displayed guidance, the user inserts both the old IC card 131 and the new IC card 132 in the card reading/writing unit 105.

The control unit 120 reads out the information stored in the old IC card 131 and also the new IC card 132 via the card reading/writing unit 105. Then, the control unit 120 reads out the account information 320 from the old IC card 131 and also the new IC card 132, and checks the read account information 320 so as to confirm justified characteristics of the old/new IC cards 131/132. Also, the control unit 120 reads out the pre-process data 340 from the old IC card 131, and then, transmits the read pre-process data 340 to the finger vein reading unit 102 (step S400).

Next, the control unit 120 displays on the display unit 103, such a guidance that the user is required to hold his finger up to the finger vein reading unit 102. When the user holds his finger up to the finger vein reading unit 102, the control unit 120 reads an image of his finger of this user by the finger vein reading unit 102, acquires a feature pattern of a living body with respect to the read finger image by employing the pre-process data 340 which has already been transmitted in a step S410, and then, stores the acquired feature pattern in the feature pattern buffer (1) 221 of the living body. At the same time, the control unit 120 transmits the feature pattern of the living body via the card reading/writing unit 105 to the old IC card 131 (step 410).

The control unit 310 of the old IC card 131 receives the feature pattern data of the living body received from the ATM 101, and stores the received feature pattern data in the storage unit 311, and then, performs a verifying process operation as to the stored feature pattern data with employment of the enrollment template data 341 (step S420). The enrollment template data 341 corresponds to the feature pattern of the living body which has been previously stored in the old IC card 131. In the verifying process operation, a coincident degree between two pieces of data is calculated. When the calculated coincident degree exceeds a preset threshold level, the control unit 310 of the old IC card 131 can agree that the user having the old IC card 131 is the authorized user, and thus, judges "authentication OK." Also, when the calculated coincident degree does not exceed the preset threshold level, the control unit 310 of the old IC card 131 cannot agree that the user having the old IC card 131 is the authorized user, and thus, judges "authentication NG".

After the above-described verifying process operation has been carried out, the control unit 120 checks whether or not the finger of the user held up to the finger vein reading unit 102 has been left from the finger vein reading unit 102 (namely, detects whether or not living body is present) (step S430). Concretely speaking, the control unit 120 judges whether or not the finger of the user has been still held up to the finger vein reading unit 102 by performing the below-mentioned method. That is, the living body illuminating LED 203 irradiates such near infrared rays toward the finger, the light amount of which has been adjusted to a proper light amount in order to detect whether or not the living body is present; this light illumination situation is photographed by the image sensor 204; and then, the acquired image is scanned in order to judge whether or not the finger of the user has been still held up to the finger vein reading unit 102. In such a case that the control unit 120 judges that the finger of the user is "present", the control unit 120 repeatedly performs the checking operation whether or not the finger is present until the finger is left from the finger vein reading unit 102. Also, within a time period during which the control unit 120 judges that the finger of the user is still present, the control unit 120 displays on the display unit 103, such a guidance that the user is required to leave his finger.

In this case, the function for judging whether or not the finger has been still held up to the finger vein reading unit 102 by the control unit 120 will also be referred to as a "living body present/absent judging unit."

In such a case that the result of confirming whether or not the user having the old IC card 131 is the authorized user in the step S420 is "authentication NG", the control unit 120 erases the feature pattern stored in the feature pattern buffer (1) 221, and thereafter, the process operation thereof is returned to the step S410 in order to again acquire the feature pattern data (step S440).

On the other hand, in such a case that the result of confirming whether or not the user having the old IC card 131 is the authorized user in the step S420 is "authentication OK", the control unit 120 repeatedly performs the process operations defined from the step S410 to the step S440 in order to judge whether or not a preselected number of feature patterns as to the living body have been acquired (step S450).

If a total number of the feature patterns of the living body which have been stored in the feature pattern buffer (1) 221 has reached the preselected pattern quantity, then the process operation is advanced to a next step S460. If a total number of the feature patterns of the living body which have been stored in the feature pattern buffer (1) 221 is smaller than the preselected pattern quantity, then the process operation is returned to the step S410 in which the control unit 120 again acquires the feature pattern data in a repetition manner.

Since the above-described process operations defined from the step S410 to the step S450 are carried out, a plurality of feature patterns of the living body are stored in the feature pattern buffer (1) 221, which could agree such a fact that the user having the old IC card 131 is the authorized user. Moreover, every time the feature pattern data of the living body is acquired, such an action occurs in which the living body is firmly and once left from the finger vein reading unit 102 and is again set onto the finger vein reading unit 102. As a result, proper perturbation is contained in each of the feature patterns as to the living body.

After the above-explained step S450, the control unit 120 selects such a feature pattern of the living body from the plurality of feature patterns thereof stored in the feature pattern buffer (1) 221, the coincident degree of which becomes the maximum coincident degree in the verifying process operations performed in the biometrics authentication function of the old IC card 131 (step S460). As a result, the control unit 120 can select such a feature pattern of the living body, which is the most resemblant to the enrollment template data 341 which has been previously enrolled in the old IC card 131.

Finally, the control unit 120 defines the feature pattern data of the living body selected in the previous step S460 as the enrollment template data 341 which is enrolled in the new IC card 132. Also, the control unit 120 produces the pre-process data 342 from the feature pattern of the living body, and then, enrolls the produced pre-process data 342 in the new IC card 132 (step S470).

Thereafter, the control unit 120 confirms as a trial operation whether or not the user having the new IC card 132 is an authorized user, and performs an invalidation with respect to the old IC card 131. Then, the control unit 120 ejects the old and new IC cards 131 and 132 from the card reading/writing unit 105 of the ATM 101, and thus, returns the ejected old/new IC cards 131/132 to the user, so that updating of the old/new IC cards 131/132 having the biometrics authentication functions is accomplished.

Since the above-described process operations defined from the step S400 to the step S470 are carried out by the control unit 120 of the ATM 101, the updating procedure can be carried out after the control unit 120 can confirm whether or not a user having an old IC card is an authorized user. As a result, even when an unmanned ATM transaction is performed, the control unit 120 can strictly confirm whether or not the user having the old IC card is the authorized user, so that illegal actions when IC cards are updated can be avoided. Also, a plurality of feature pattern acquiring operations as to a living body are carried out, and a suitable feature pattern is selected from these acquired feature patterns, and then, the selected suitable feature pattern is enrolled to a new IC card. As a consequence, since such a feature pattern data (biological information) which is highly resemblant to the biological information which has been previously enrolled in the old IC card is enrolled in a new IC card, a deterioration as to the enrollment feature patterns can be avoided. As a result, it is possible to avoid that authentication precision in the updated new IC card is lowered, and thus, it is expectable to maintain such an authentication precision which is equivalent to that of the old IC card.

It should also be understood that in FIG. 4, the below-mentioned operation mode has been explained: That is, the user brings the new IC card 132 to the ATM 101 and then inserts this new IC card 132 into the card reading/writing unit 105. Alternatively, while a new IC card may be previously prepared in the ATM 101, the new IC card may be issued, if required. As a result, it is possible to avoid such a cumbersome operation made by a user.

Figure 5:
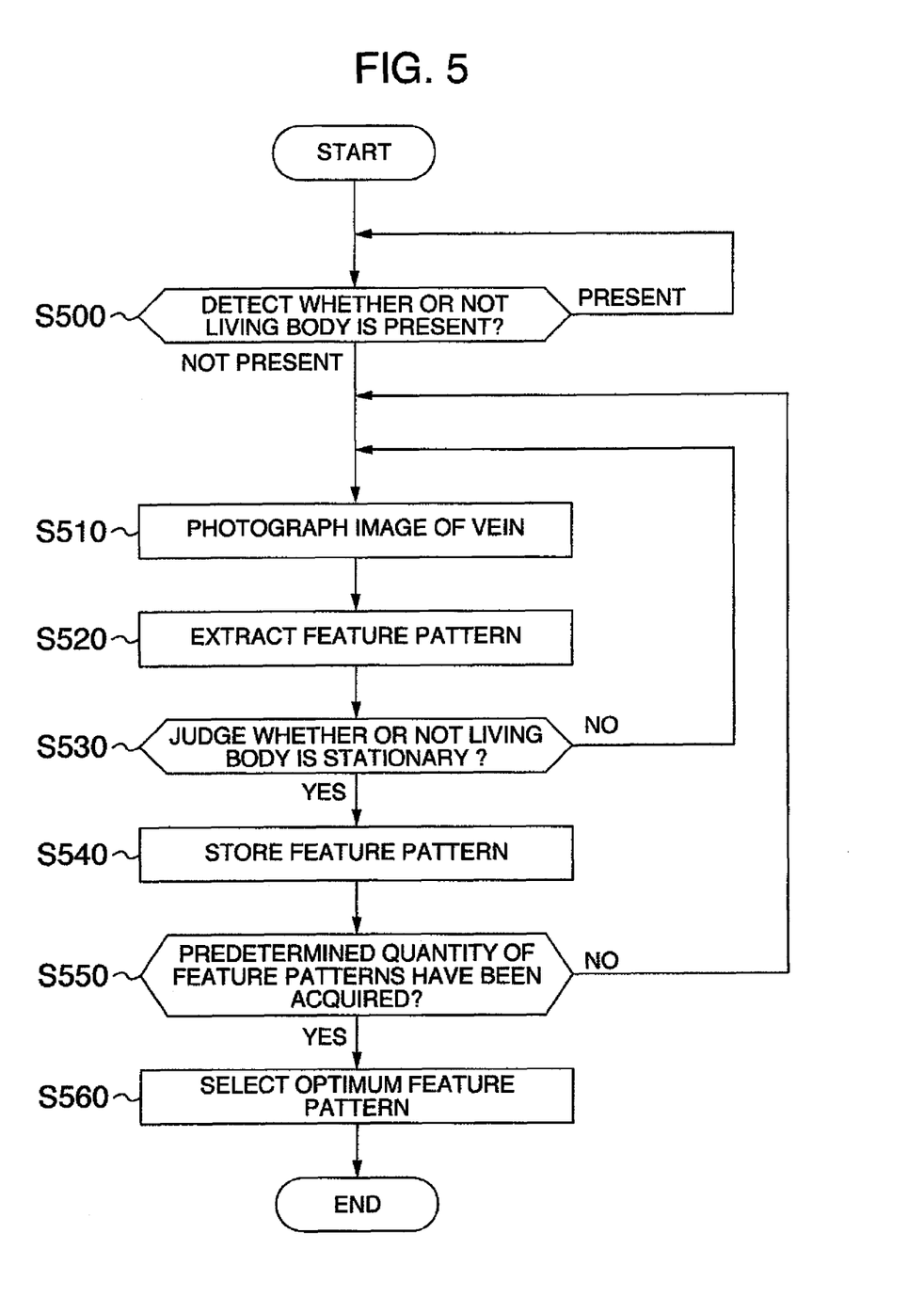
FIG. 5 is a flow chart for describing process operations for reading a feature pattern of a living body, according to the embodiment of the present invention.

FIG. 5 is a flow chart for describing a detailed process operation executed when the feature pattern of the living body is acquired in the above-described step S410. Referring now to the flow chart, a description is made of the respective process steps for acquiring the feature patterns of the living body.

The control unit 120 judges whether or not a finger of a user is present by performing the below-mentioned method (step S500): That is, the living body illuminating LED 203 irradiates such near infrared rays toward the finger (namely, living body), the light amount of which has been adjusted to a proper light amount in order to detect whether or not the living body is present; an image of the living body is photographed by the image sensor 204; and then, the photographed image is scanned in order to judge whether or not the finger of the user is present. In such a case that the control unit 120 judges that the finger of the user is "not present", the control unit 120 repeatedly judges whether or not the finger of the user is present, and waits such a situation that the finger is held up to the finger vein reading unit 102. When the control unit 120 judges that the finger of the user is "present", the process operation is advanced to a next step S510.

The control unit 120 causes the living body illuminating LED 203 to irradiate near infrared rays toward a finger of a user (namely, living body), the light amount of which has been adjusted to a proper light amount in order to photograph a vein pattern of the living body; the control unit 120 photographs a vein image of his finger by operating the image sensor 204, and then, stores the photographed vein image in the image buffer 220 (step S510).

In addition, the control unit 120 extracts a pattern of the vein from the vein image stored in the image buffer 220, and cuts off a portion which is used in the authenticating process operation while referring to the pre-process data 340, and thus, produces feature pattern data of the living body (step S520).

Since the control unit 120 repeatedly performs the vein pattern extracting operation executed in the previous step S520 plural times, the control unit 120 compares a feature pattern of the living body which was extracted in the past with a feature pattern of the living body which has been extracted in the present stage, and thus, judges whether or not the living body is under stationary situation by employing a coincident degree between these compared feature patterns of the living body. In other words, in such a case that the living body is under the stationary situation, since the position of the finger is not completely changed, it is expectable that a coincident degree among the feature patterns of the living body which have been acquired plural times may become excessively high. In such a case that a coincident degree of verification is low, the control unit 120 judges that the living body is not under stationary situation. The process operation is returned to the previous step S510 in which the control unit 120 repeatedly performs the stationary judging process operation until the finger becomes stationary (step S530).

On the other hand, in such a case that a coincident degree of verification is high, the control unit 120 judges that the living body is under stationary situation, and thus, stores the feature pattern data in the feature pattern buffer (2) 222 (step S540).

Next, the control unit 120 judges whether or not a predetermined quantity of feature patterns as to the living body have been acquired by repeatedly performing the process operations defined from the step S510 to the step S540. In this case, if a total amount of the acquired feature patterns becomes smaller than the predetermined quantity, then the process operation is returned to the step S510 in which the control unit 120 maintains the acquiring operation of the feature patterns in a continuous manner.

On the other hand, if a total number of feature patterns of the living body which have been stored in the feature pattern buffer (2) 222 reaches the predetermined quantity, then the process operation is advanced to a next step (step S550). Since a series of the above-described process operations are carried out, a plurality of feature patterns as to the living body which have been acquired in the continuous manner are stored in the feature pattern buffer (2) 222.

Finally, the control unit 120 selects an optimum feature pattern from the plural pieces of feature patterns which have been stored in the feature pattern buffer (2) 222 (step S560).

As one example as to methods for selecting an optimum feature pattern, the below-mentioned selection method may be realized. In a feature pattern of a living body, a position where a vein is present is allocated as "1", and another position where the vein is not present is allocated as "0" in order to represent a pattern shape of the vein. In this example, as to such a feature pattern of the living body in which a large number of "1" may appear, the control unit 120 may judge the veins many times, so that a larger amount of information required in the biometrics authentication may be secured. As a consequence, the control unit 120 counts "1" contained in feature patterns of the living body, and thus, defines such a feature pattern of the living body which contains a large number of "1" as the above-described optimum feature pattern of the living body.

The optimum feature pattern data of the living body selected in this example is stored in the feature pattern buffer (1) 221, and at the same time, is transferred to the ATM 101.

Since the above-explained process operations defined from the step S500 to the step S560 are carried out, such a process operation for acquiring the biological feature patterns of the user is accomplished in the finger vein reading unit 102.

It should also be noted that the above-explained embodiment has exemplified that the control unit 120 detects whether or not the living body is present by photographing the image of the living body in the step S500. As another detecting method, while a switch may be provided so as to detect whether or not a living body is present, the control unit 120 may alternatively detect whether or not the living body is present by checking ON/OFF statuses of the switch.

Also, the above-described embodiment has exemplified that the control unit 120 repeatedly performs the feature pattern acquiring operation as to the living body in the continuous manner until the total number of the acquired feature patterns reaches the predetermined number in the step S550. Alternatively, as another method, the control unit 120 may repeatedly execute the feature pattern acquiring operation as to the living body in the continuous manner until a predetermined limit time has elapsed.

Also, the above-described embodiment has exemplified that the control unit 120 selects the optimum feature pattern of the living body from the plurality of feature patterns thereof in the steps S460 and S560. Alternatively, the control unit 120 may produce such an optimum feature pattern by employing the plurality of feature patterns. As one example of the pattern producing methods, this pattern producing method may be realized by averaging the plurality of feature patterns.

Further, the above-explained embodiment has exemplified that the biological information about one finger has been previously enrolled in the IC card. Alternatively, in such a case that a plurality of biological information have been previously enrolled in an IC card, a similar updating process operation may be repeatedly applied to each of plural pieces of the biological information.

In addition, the above-explained embodiment has exemplified that both the feature pattern acquiring operation for confirming whether or not the user having the IC card is the authorized user, and the feature pattern acquiring operation for constructing the updated enrollment data are carried out at the same time. Alternatively, after such a confirmation has been previously performed whether or not a user having an old IC card is an authorized user by utilizing a biometrics authentication function of the old IC card, a feature pattern of the living body (user) may be acquired in order to perform an updating operation.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A card processing apparatus comprising:
   a biological information acquiring unit for acquiring biological information as to a user from the user;
   a card handling unit for reading information which has been stored in a card;
   a storage unit for storing thereinto the biological information read by said biological information acquiring unit together with a coincident degree in verifying process in such a case that as a result of comparing biological information read from the card by said card handling unit with the biological information read from the user by said biological information acquiring unit, when coincident degree in the verifying process of biological information read out of the card and biological information read out of the biological information acquiring unit exceeds a predetermined threshold, and a confirmation is made that said user is an owner of said card; and
   a control unit for judging on whether there is body of the user existed in the biological information acquiring unit after acquiring biological information of the user by the biological information acquiring unit, and if the body of the user is not existed, then judging whether or not storing operations for storing the biological information in said storage unit have been carried out preselected times, for producing biological information which is stored in another card which will be newly issued by employing plural pieces of the biological information stored in said storage unit and the coincident degree with the biological information read out of the card in such a case that said storing operations have been carried out the preselected times, and for instructing the user to again acquire biological information thereof in such a case that said storing operations have not yet been carried out the preselected times.

2. A card processing apparatus as claimed in claim 1 wherein:
   said control unit produces the biological information to be stored in the card which will be newly issued by determining one piece of such a biological information which is resemblant to the biological information read from the card by said card handing unit among the plurality of biological information.

3. A card processing apparatus as claimed in claim 1 wherein:
   said control unit produces the biological information to be stored in the card which will be newly issued by forming one piece of averaged biological information based upon said plurality of biological information.

4. A card processing apparatus as claimed in claim 1, further comprising:
   a living body present/absent judging unit for judging whether or not a living body has been left from said biological information acquiring unit; wherein: every time acquiring of the biological information is performed, said living body present/absent judging unit judges whether or not the living body has been left from the biological information acquiring unit; and in such a case that said living body present/absent judging unit judges that the living body has not yet been left, said control unit instructs that the user is required to leave the living body.

5. A card processing apparatus as claimed in claim 1, further comprising:
   a living body stationary judging unit for judging whether or not a living body has been stayed at a predetermined position of said biological information acquiring unit; wherein:
   when the biological information is acquired, said living body stationary judging unit judges whether or not the living body has been stayed at said predetermined position; in such a case that said living body stationary judging unit judges that the living body has been stayed, said control unit acquires the biological information; and in such a case that said living body stationary judging unit judges that the living body has not been stayed, the control unit repeatedly issues such an instruction that the living body is required to be stayed until the living body becomes stationary.

6. A card processing apparatus as claimed in claim 1 wherein:
   when the biological information is acquired by said living body information acquiring unit, said control unit judges whether or not a predetermined quantity of biological information have been acquired in a continuous manner; in such a case that the control unit judges that said predetermined quantity of biological information have been acquired, said control unit determines one piece of biological information which is suitable for an enrollment among said plurality of biological information acquired in the continuous manner; and in such a case that the control unit judge that said predetermined quantity of biological information have not yet been acquired, said control unit causes the biological information acquiring unit to again acquire biological information.

7. A card processing apparatus as claimed in claim 1 wherein:
   when the biological information is acquired by said living body information acquiring unit, said control unit judges whether or not a predetermined quantity of biological information have been acquired in a continuous manner; in such a case that the control unit judges that said predetermined quantity of biological information have been acquired, said control unit produces one piece of averaged biological information based upon said plurality of biological information acquired in the continuous manner; and in such a case that the control unit judges that said predetermined quantity of biological information have not yet been acquired, said control unit causes the biological information acquiring unit to again acquire biological information.

8. A card processing apparatus as claimed in claim 1 wherein:
   when the biological information is acquired by said living body information acquiring unit, said control unit judges whether or not a plurality of biological information have been acquired in a continuous manner until a predetermined time has elapsed; in such a case that the control unit judges that said plurality of biological information have been acquired, said control unit determines one piece of biological information which is suitable for an enrollment among said plurality of biological information acquired in the continuous manner; and in such a case that the control unit judges that said plurality of biological information have not yet been acquired, said control unit causes the biological information acquiring unit to again acquire biological information.

9. A card processing apparatus as claimed in claim 1 wherein:
when the biological information is acquired by said living body information acquiring unit, said control unit judges whether or not a plurality of biological information have been acquired in a continuous manner until a predetermined time has elapsed; in such a case that the control unit judges that said plurality of biological information have been acquired, said control unit produces one piece of averaged biological information based upon said plurality of biological information acquired in the continuous manner; and in such a case that the control unit judges that said plurality of biological information have not yet been acquired, said control unit causes the biological information acquiring unit to again acquire biological information.

10. A card processing method comprising:
a first step for acquiring biological information as to a user from the user;
a second step for reading information which has been stored in a card;
a third step for storing thereinto the biological information read by a biological information acquiring unit together with a coincident degree in verifying process in such a case that as a result of comparing biological information read from the card by a card handling unit with the biological information read from the user by said biological information acquiring unit, when coincident degree in the verifying process of biological information read out of the card and biological information read out of the biological information acquiring unit exceeds a predetermined threshold, and a confirmation is made that said user is an owner of said card; and
a fourth step for judging on whether there is body of the user is existed in the biological information acquiring unit after acquiring biological information of the user by the biological information acquiring unit, and if the body of the user is not existed, then judging whether or not storing operations of the biological information have been carried out preselected times, for producing biological information which is stored in another card which will be newly issued by employing a plurality of biological information stored in a storage unit and the coincident degree with the biological information read out of the card in such a case that said storing operations have been carried out the preselected times, and for instructing the user to again acquire biological information thereof in such a case that said storing operations have not yet been carried out the preselected times.

11. A card processing method as claimed in claim 10 wherein:
said fourth step produces the biological information to be stored in the card which will be newly issued by determining one piece of such a biological information which is resemblant to the biological information read from the card by said card handing unit among the plurality of biological information.

12. A card processing method as claimed in claim 10 wherein:
said fourth step produces the biological information to be stored in the card which will be newly issued by forming one piece of averaged biological information based upon said plurality of biological information.

13. A card processing method as claimed in claim 10, further comprising:
a fifth step in which every time acquiring of the biological information is performed, a living body present/absent judging unit judges whether or not the living body has been left; and in such a case that said living body present/absent judging unit judges that the living body has not been left, such an instruction is issued that the user is required to leave the living body.

14. A card processing method as claimed in claim 10, further comprising:
a sixth step in which when the biological information is acquired, a living body stationary judging unit judges whether or not the living body is stayed at a predetermined position; in such a case that said living body stationary judging unit judges that the living body has been stayed, the biological information is acquired; and in such a case that said living body stationary judging unit judges that the living body has not been stayed, such an instruction is repeatedly issued that the living body is required to be stayed until the living body becomes stationary.

15. A card processing method as claimed in claim 10 wherein:
said first step judges whether or not a predetermined quantity of biological information have been acquired in a continuous manner; when said first step judges that said predetermined quantity of biological information have been acquired, said first step determines one piece of biological information which is suitable for an enrollment among said plurality of biological information acquired in the continuous manner; and when said first step judges that said predetermined quantity of biological information have not yet been acquired, said first step again acquires biological information.

16. A card processing method as claimed in claim 10 wherein:
said first step judges whether or not a predetermined quantity of biological information have been acquired in a continuous manner; when said first step judges that said predetermined quantity of biological information have been acquired, said first step determines one piece of averaged biological information based upon said plurality of biological information acquired in the continuous manner; and when said first step judges that said predetermined quantity of biological information have not yet been acquired, said first step again acquires biological information.

17. A card processing method as claimed in claim 10 wherein:
said first step judges whether or not a plurality of biological information have been acquired in a continuous manner until a predetermined time has elapsed; when said first step judges that said plurality of biological information have been acquired in the continuous manner, said first step determines one piece of biological information which is suitable for an enrollment among said plurality of biological information in the continuous manner; and when said first step judges that said plurality of biological information have not yet been acquired in the continuous manner, said first step again acquires biological information.

18. A card processing method as claimed in claim 10 wherein:

said first step judges whether or not a plurality of biological information have been acquired in a continuous manner until a predetermined time has elapsed; when said first step judges that said plurality of biological information have been acquired in the continuous manner, said first step produces one piece of averaged biological information based upon said plurality of biological information in the continuous manner; and when said first step judges that said plurality of biological information have not yet been acquired in the continuous manner, said first step again acquires biological information.

* * * * *